United States Patent
Shih et al.

(10) Patent No.: US 8,483,951 B2
(45) Date of Patent: Jul. 9, 2013

(54) IMAGE PROCESSING METHOD AND SYSTEM

(75) Inventors: Ming-Yu Shih, Taoyuan County (TW);
Lih-Guong Jang, Hsinchu (TW);
Jen-Hui Chuang, Hsinchu (TW);
Chin-Chung Nien, Hsinchu (TW);
Hsiao-Hu Tan, Hsinchu (TW);
Chen-Chin Cheng, Hsinchu (TW);
Shyi-Shing Hsieh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 320 days.

(21) Appl. No.: 12/832,538

(22) Filed: Jul. 8, 2010

(65) Prior Publication Data

US 2011/0118973 A1    May 19, 2011

(30) Foreign Application Priority Data

Nov. 16, 2009   (TW) ................................ 98138903 A (51) Int. Cl.
*G01C 11/00*    (2006.01)
(52) U.S. Cl.
USPC .............................. 701/411; 701/28; 701/523
(58) Field of Classification Search
USPC .................. 701/411–414, 416, 417, 426, 523,
701/23, 28, 438, 530; 348/116, 118, 119;
340/995.19, 995.21, 995.22, 995.24; 901/1,
901/46, 47; 384/104
See application file for complete search history.

(56) References Cited

U.S. PATENT DOCUMENTS

| | | | |
|---|---|---|---|
| 4,278,142 A * | 7/1981 | Kono | ............................ 180/168 |
| 5,416,478 A | 5/1995 | Morinaga | |
| 5,470,233 A | 11/1995 | Fruchterman et al. | |
| 5,897,602 A | 4/1999 | Mizuta | |
| 5,961,571 A | 10/1999 | Gorr et al. | |
| 6,041,280 A | 3/2000 | Kohli et al. | |
| 6,363,161 B2 | 3/2002 | Laumeyer et al. | |
| 6,449,384 B2 | 9/2002 | Laumeyer et al. | |
| 6,546,334 B1 | 4/2003 | Fukuchi et al. | |

(Continued)

FOREIGN PATENT DOCUMENTS

| EP | 0606385 B1 | 5/2001 |
|---|---|---|
| TW | 200622196 A | 7/2006 |

(Continued)

OTHER PUBLICATIONS

C.Y. Fanga et al., "An automatic road sign recognition system based on a computational model of human recognition processing," Computer Vision and Image Understanding 96 (2004) 237-268.

Jim Torresen et al., "A Camera Based Speed Limit Sign Recognition System," in Proc. of 13th ITS World Congress and Exhibition, 2006, pp. 1-9.

(Continued)

*Primary Examiner* — Mark Beauchaine
(74) *Attorney, Agent, or Firm* — Rabin & Berdo, P.C.

(57) ABSTRACT

An image processing method and a system are provided. The image processing method of moving camera comprises the following steps. An image of a road is captured by a first camera unit. A coordinate of the image of an object shown in the image of the road is captured when the image of the object shown in the image of the road is selected. At least an aiming angle of a second camera unit is adjusted according to the coordinate to make the field-of-view of the second camera unit aligned with the object. The image of the object is captured by the second camera unit. The image of the object is enlarged.

4 Claims, 6 Drawing Sheets

U.S. PATENT DOCUMENTS

| | | | |
|---|---|---|---|
| 6,711,280 | B2 | 3/2004 | Stafsudd et al. |
| 6,917,800 | B1 | 7/2005 | Rychlak |
| 6,937,747 | B2 | 8/2005 | Culp et al. |
| 7,039,521 | B2 | 5/2006 | Hortner et al. |
| 7,043,346 | B2 * | 5/2006 | Kubota et al. ............ 701/28 |
| 7,274,311 | B1 | 9/2007 | MacLeod |
| 7,353,110 | B2 | 4/2008 | Kim |
| 7,447,362 | B2 | 11/2008 | Lev |
| 2001/0032070 | A1 | 10/2001 | Teicher |
| 2003/0151664 | A1 | 8/2003 | Wakimoto et al. |
| 2003/0202683 | A1 | 10/2003 | Ma et al. |
| 2003/0210806 | A1 | 11/2003 | YoichiShintani et al. |
| 2005/0019446 | A1 | 1/2005 | Kawa et al. |
| 2005/0278111 | A1 | 12/2005 | Ujino |
| 2006/0012493 | A1 * | 1/2006 | Karlsson et al. ...... 340/995.24 |
| 2007/0118281 | A1 | 5/2007 | Adam et al. |
| 2007/0199076 | A1 | 8/2007 | Rensin et al. |
| 2008/0042812 | A1 | 2/2008 | Dunsmoir et al. |
| 2009/0074249 | A1 | 3/2009 | Moed et al. |

FOREIGN PATENT DOCUMENTS

| | | |
|---|---|---|
| TW | 200702633 A | 1/2007 |
| TW | 200944270 A1 | 11/2009 |
| TW | 200944830 A1 | 11/2009 |

OTHER PUBLICATIONS

Yok-Yen Nguwi et al., "Automatic Road Sign Recognition Using Neural Networks," 2006 International Joint Conference on Neural Networks, Vancouver, BC, Canada, Jul. 16-21, 2006, pp. 3955-3962.

Wen Wu et al., "Incremental Detection of Text on Road Signs from Video with Application to a Driving Assistant System," Proceedings of ACM Multimedia 2004, New York, NY, Oct. 10-16, 2004, pp. 852-859.

Marcin L. Eichner et al., "Integrated Speed Limit Detection and Recognition from Real-Time Video," 2008, IEEE Intelligent Vehicles Symposium.

Bjorn Johansson, "Road Sign Recognition from a Moving Vehicle," 2002, pp. 1-72.

Andrzej Ruta et al., "Towards Real-Time Traffic Sign Recognition by Class-Specific Discriminative Features," 2010, Elsevier Science Inc., vol. 43, Issue 1, pp. 416-430.

Auranuch Lorsakul et al., "Traffic Sign Recognition for Intelligent Vehicle/Driver Assistance System Using Neural Network on OpenCV," The 4th International Conference on Ubiquitous Robots and Ambient Intelligence (URAI 2007).

* cited by examiner

IMAGE PROCESSING METHOD AND SYSTEM

This application claims the benefit of Taiwan application Serial No. 098138903, filed Nov. 16, 2009, the subject matter of which is incorporated herein by reference.

BACKGROUND OF THE DISCLOSURE

1. Field of the Disclosure

The disclosure relates in general to an image processing method and the system, and more particularly to an image of a road processing method and a system.

2. Description of the Related Art

Along with the development in satellite technology, a navigation system enabling the driver to position the transport worldwide by the satellite is provided. After the longitude and the latitude of the transportation device is checked, the current position of the transportation device can be marked on a map, and a navigation route can be formatted on the map through the selection of destination.

The map provided by the current navigation system is drawn by the computer, and the map drawn by the computer is lack of vividness. When driving, the driver has to compare the map drawn by the computer to actual image of a road in order to understand the navigation information provided by the navigation system.

Besides, the current navigation system can only provide simple orientation and cannot incorporate various factors of the actual image of the road, so the practicality of the navigation system is restricted.

SUMMARY OF THE DISCLOSURE

The disclosure is directed to an image processing method and a system. The information of the road or the image of a landmark ahead is obtained through the analysis of the image of the road, and the practicality of the navigation system is largely increased.

According to a first aspect of the present disclosure, an image processing method is provided. The image processing method includes the following steps. The image of a road is captured by a first camera unit. A coordinate of the image of an object shown in the image of the road is captured when the image of the object shown in the image of the road is selected. At least an aiming angle of a second camera unit is adjusted according to the coordinate to make the field-of-view of the second camera unit aligned with the object. The image of the object is captured by the second camera unit. The image of the object is enlarged.

According to a second aspect of the present disclosure, an image processing method is provided. The image processing method includes the following steps. A first searching term and a second searching term for searching the image of an object are provided. The image of a road is captured by a first camera unit. Whether the image of the road shows the image of the object is determined. The image of the object matches the first searching term and has a coordinate. At least an aiming angle of a second camera unit is adjusted according to the coordinate to make the field-of-view of the second camera unit aligned with the object if the image of the road shows the image of the object matching the first searching term. The image of the object is captured and enlarged by the second camera unit if the image of the object matches the second searching term.

According to a third aspect of the present disclosure, an image processing method is provided. The image processing method includes the following steps. The image of a landmark, the longitude of the landmark and the latitude of the landmark are provided. The image of a road is captured by a first camera unit configured in a transportation device. The longitude of the transportation device and the latitude of the transportation device are captured. The image of the landmark in the image of the road is searched when the longitude and latitude of the transportation device are close to that of the landmark.

According to a fourth aspect of the present disclosure, an image processing method is provided. The image processing method includes the following steps. The image of a landmark, the longitude of the landmark and the latitude of the landmark are provided. The image of a road is captured. Whether the image of the road shows the image of the landmark is determined. The longitude and latitude of the landmark are displayed if the image of the road shows the image of the landmark.

According to a fifth aspect of the present disclosure, an image processing method is provided. The image processing method includes the following steps. A navigation route of a transportation device and the image of a landmark corresponding to the navigation route are provided. The image of the road is captured by a first camera unit. Whether the image of the road shows the image of the landmark is determined when the transportation device deviates from the navigation route. The navigation route is modified if the image of the road does not show the image of the landmark.

According to a sixth aspect of the present disclosure, an image processing system is provided. The image processing system includes a first camera unit, a processing unit, at least a second camera unit and a tracking unit. The first camera unit is for capturing the image of a road. The processing unit is for computing a coordinate of the image of an object shown in the image of the road when the image of the object is selected. The tracking unit is for adjusting an aiming angle of the second camera unit according to the coordinate to make the field-of-view of the second camera unit aligned with the object for capturing the image of the object. The processing unit further is for enlarging the image of the object.

According to a seventh aspect of the present disclosure, an image processing system is provided. The image processing system includes a storage unit, a first camera unit, a processing unit, at least a second camera unit and a tracking unit. The storage unit is for storing a first searching term and a second searching term for searching the image of an object. The first camera unit is for capturing the image of a road. The processing unit is for determining whether the image of the road shows the image of the object. The image of the object matches the first searching term and has a coordinate. The tracking unit is for adjusting an aiming angle of the second camera unit according to the coordinate to make the field-of-view of the second camera unit aligned with the object for capturing the image of the object. If the image of the object matches the second searching term, then the processing unit further enlarges the image of the object.

According to an eighth aspect of the present disclosure, an image processing system is provided. The image processing system is configured in a hand-held apparatus or is configured in a transportation device. The image processing system includes a storage unit, a first camera unit, a GPS receiving unit and a processing unit. The storage unit is for storing the image of a landmark, the longitude of the landmark and the latitude of the landmark. The first camera unit is for capturing the image of a road. The global positioning system (GPS receiving unit) receiving unit is for capturing the longitude and the latitude of the transportation device. The processing unit is for searching the image of the landmark in the image of the road when the longitude and latitude of the transportation device are close to that of the landmark.

According to a ninth aspect of the present disclosure, an image processing system is provided. The image processing system includes a storage unit, a first camera unit, a processing unit and a display unit. The storage unit is for storing the image of a landmark, the longitude of the landmark and the latitude of the landmark. The first camera unit is for capturing the image of a road. The processing unit is for determining whether the image of the road shows the image of the landmark. The display unit is for displaying the longitude and latitude of the landmark if the image of the road shows the image of the landmark.

According to a tenth aspect of the present disclosure, an image processing system is provided. The image processing system is configured in a hand-held apparatus or is configured in a transportation device. The image processing system includes a storage unit, a camera unit and a processing unit. The storage unit is for storing a navigation route and the image of a landmark corresponding to the navigation route. The first camera unit is for capturing the image of a road. The processing unit is for determining whether the image of the road shows the image of the landmark when the transportation device deviates from the navigation route, and modifying the navigation route if the image of the road does not show the image of the landmark.

The disclosure will become apparent from the following detailed description of the preferred but non-limiting embodiments. The following description is made with reference to the accompanying drawings.

DETAILED DESCRIPTION OF THE DISCLOSURE

A number of embodiments are disclosed below for elaborating the disclosure only not for limiting the scope of protection of the disclosure. Besides, secondary elements are omitted in the following embodiment to highlight the technical features of the disclosure.

Figure 1:
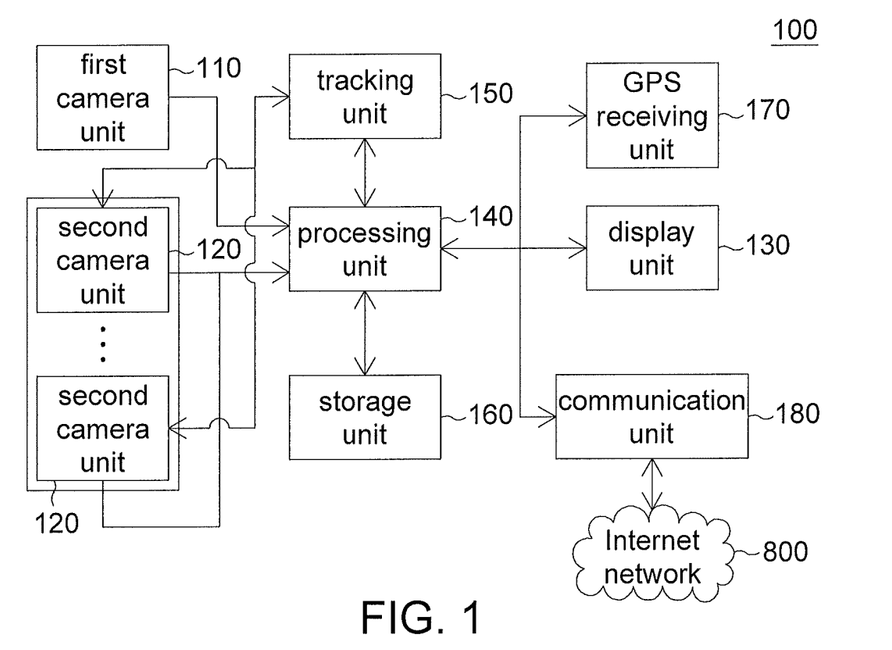
FIG. 1 shows a block diagram of an image processing system according to an embodiment of the disclosure.

Referring to FIG. 1, a block diagram of an image processing system according to an embodiment of the disclosure is shown. The image processing system 100 is configured in a transportation device or a hand-held electronic device. The image processing system 100 of the present embodiment of the disclosure includes a first camera unit 110, a number of second camera units 120, a display unit 130, a processing unit 140, a tracking unit 150, a storage unit 160, a global positioning system (GPS) receiving unit 170 and a communication unit 180. The first camera unit 110 is for capturing the image 910 of a road (illustrated in FIG. 2). The field-of-view of the first camera unit 110, such as a fixed focal camera, is aligned with the front of the transportation device. Each second camera unit 120 is for capturing the image of an object (such as the image 930 of FIG. 2). The field-of-view of each second camera unit 120, such as a pan-tilt-zoom camera, is aligned with different angles of the transportation device. The display unit 130, such as a touch control display panel, is for displaying various types of information and receiving a touched signal. The processing unit 140 is for performing various computing algorithms or determination procedures. The tracking unit 150 is for controlling a second camera unit 120 to make the field-of-view of the second camera unit 120 aligned with a particular object (such as the object 930 of FIG. 2). The processing unit 140 and the tracking unit 150 are such as a chip, a firmware circuit or a computer readable medium in which several programming codes are stored. The storage unit 160 is for storing various types of information, such as memory, hard disc, flash drive and so on. The GPS receiving unit 170 is for receiving the longitude and the latitude of the transportation device. The communication unit 180 such as a 3G module or a wireless network transmission module is for transmitting various types of information.

Figure 2:
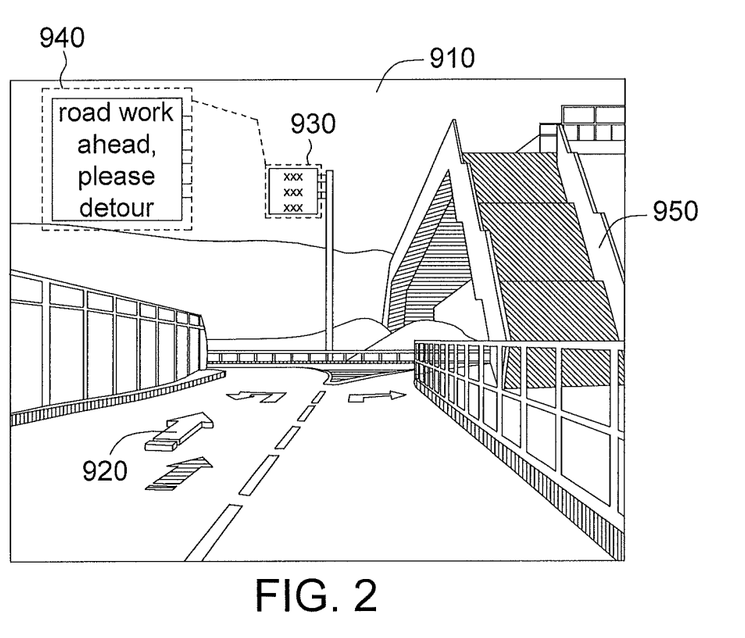
FIG. 2 shows the image of a road according to the present embodiment of the disclosure.

Referring to FIG. 2, the image 910 according to the present embodiment of the disclosure is shown. During the movement of the transportation device, the display unit 130 directly displays the image 910. A navigation index 920 is then directly displayed on the image 910, so that the driver can better understand the indicated direction. Besides, the special functions and operations of the image processing system 100 of the present embodiment of the disclosure are further elaborated below with several accompanying flowcharts.

Figure 3:
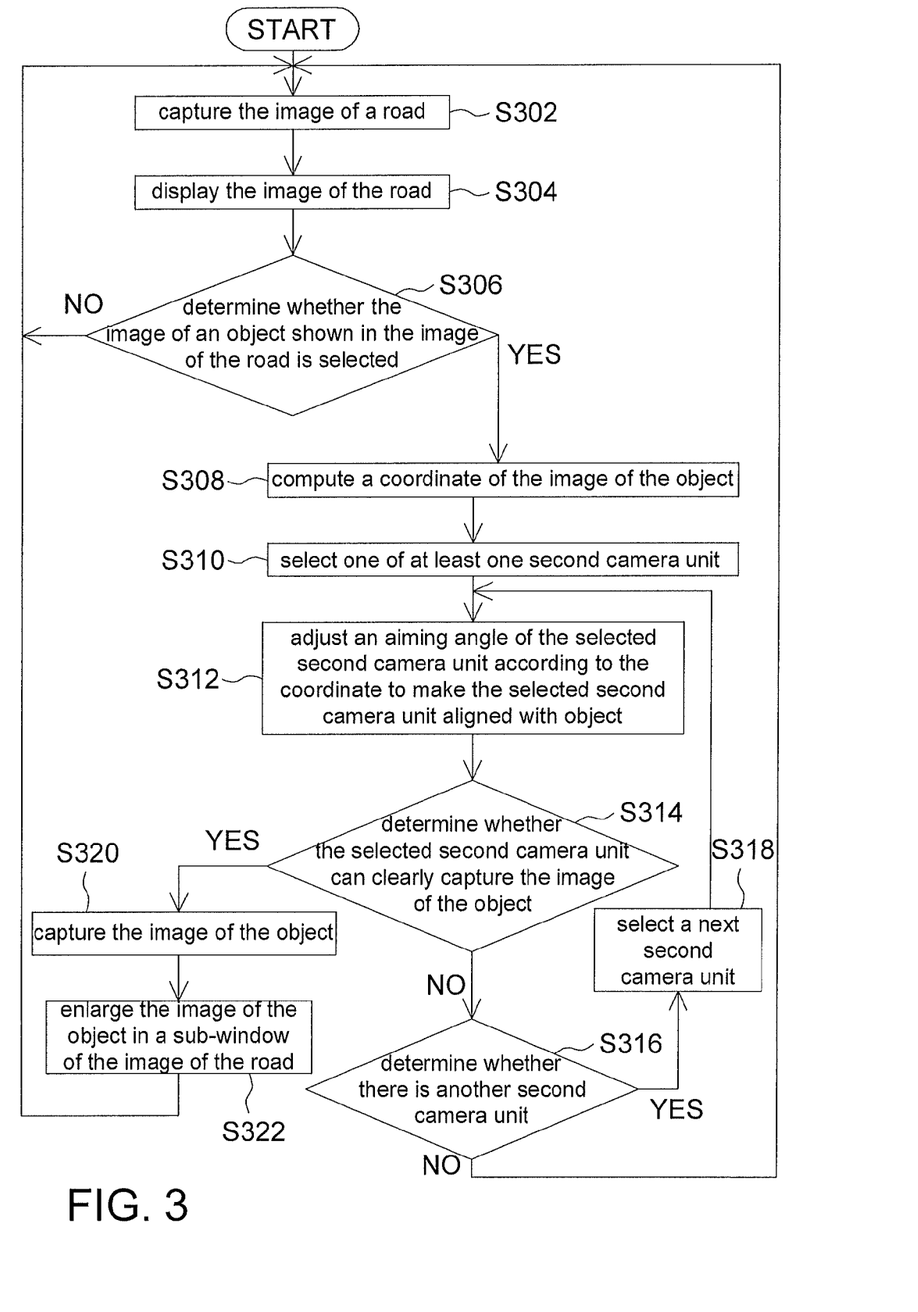
FIG. 3 shows a flowchart of manually enlarging the image of an object according to the present embodiment of the disclosure.

Referring to FIGS. 1 to 3. FIG. 3 shows a flowchart of manually enlarging the image 930 of the object according to the present embodiment of the disclosure. During the movement of the transportation device, the driver or the passenger may be interested in the image 930 such as the image of a building, a shop sign, a license plate or a figure sighted at a remote distance. The following flowcharts enable the driver or the passenger to freely select the image 930 shown on the image 910, and further enlarge the selected image 930 on the display unit 130.

Firstly, the method begins at step S302, the image 910 is captured by the first camera unit 110.

Next, the method proceeds to step S304, as indicated in FIG. 2, the image 910 is displayed on the display unit 130.

Then, the method proceeds to step S306, whether the image 930 in the image 910 is selected is determined by the processing unit 140. If the image 930 in the image 910 is selected, then the method proceeds to step S308, and if the image 930 is not selected, then the method returns to step S302.

Afterwards, the method proceeds to step S308, a coordinate of the image 930 in the image 910 is computed by the processing unit 140. Wherein, the coordinate corresponds to a coordinate system of the image 910.

After that, the method proceeds to step S310, one of the second camera units 120 is selected by the tracking unit 150.

Following that, the method proceeds to step S312, an aiming angle of the selected second camera unit 120 is adjusted by the tracking unit 150 according to the coordinate to make the field-of-view of the selected second camera unit 120 aligned with object.

Next, the method proceeds to step S314, whether the selected second camera unit 120 can clearly capture the image 930 is determined by the processing unit 140. If the image 930 can be clearly captured, then the method proceeds to step S320, and if the image 930 cannot be clearly captured, then the method proceeds to step S316.

Then, the method proceeds to step S316, whether there is another second camera unit 120 is determined by the tracking unit 150. If there is another second camera unit 120, then the method proceeds to step S318, and if there is no other second camera unit 120, then the method returns to step S302.

Afterwards, the method proceeds to step S318, a next second camera unit 120 is selected by the tracking unit 150, then the method returns to step S312 until the image 930 is clearly captured by one particular second camera unit 120.

After that, the method proceeds to step S320, the image 930 is clearly captured by the second camera unit 120.

Lastly, the method proceeds to step S322, the image 930 is displayed and enlarged in a sub-window 940 of the image 910 by the processing unit 140.

Through the above procedures, the driver or the passenger can freely select the image 930, such as the image of an interesting building, shop sign, license plate or figure in the image 910 and further enlarge the image 930 on the sub-window 940.

Figure 4:
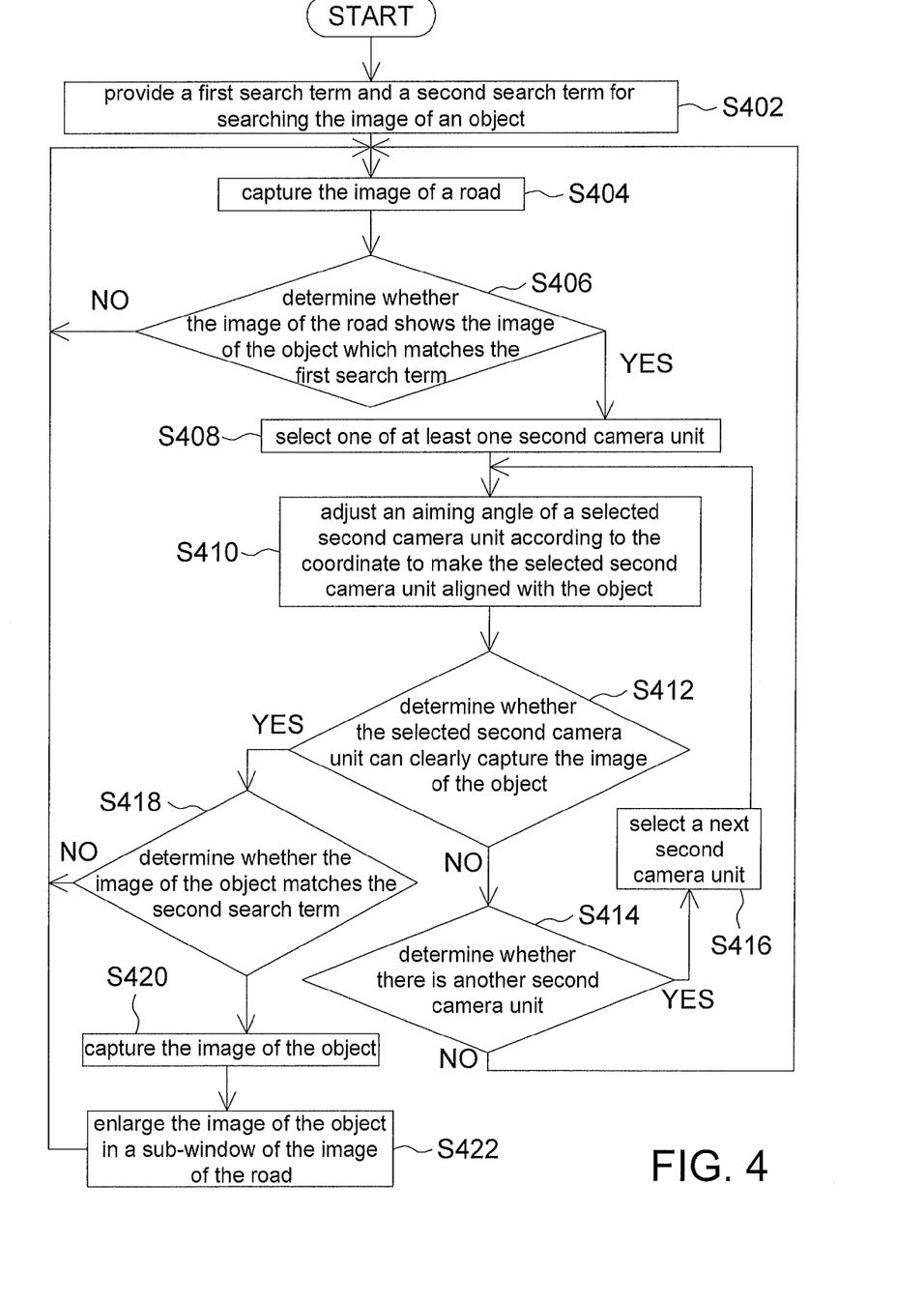
FIG. 4 shows a flowchart of automatically enlarging the image of the object according to the present embodiment of the disclosure.

FIG. 4 shows a flowchart of automatically enlarging the image 930 of the object according to the present embodiment of the disclosure. During the movement of the transportation device, if the driver can be automatically reminded of the image 930, such as an image of a traffic sign or a traffic notice, the driver will be able to prepare in advance so as to improve transport safety. The following procedures illustrate how the image processing system 100 automatically enlarges the image 930.

Firstly, the method begins at step S402, at least a first searching term and a second searching term for searching the image 930 are provided by the storage unit 160. The first searching term is such as a shape of the object, and the second searching term is such as a color, a texture or a text of the object. In the present embodiment of the disclosure, the object corresponds to two searching terms. However, the object may correspond to more than two searching terms.

Next, the method proceeds to step S404, the image 910 is captured by the first camera unit 110.

Then, the method proceeds to step S406, whether the image 910 shows the image 930 which matches the first searching term is determined. If the image 910 shows the image 930 which matches the first searching term, then the method proceeds to step S408, and if the image 910 does not show the image 930 which matches the first searching term, then the method returns to step S404.

Afterwards, the method proceeds to step S408, one of the second camera units 120 is selected by the tracking unit 150.

After that, the method proceeds to step S410, the aiming angle of the selected second camera unit 120 is adjusted by the tracking unit 150 according to the coordinate to make the field-of-view of the selected second camera unit 120 aligned with the object.

Following that, the method proceeds to step S412, whether the selected second camera unit 120 can clearly capture the image 930 is determined by the processing unit 140. If the image 930 can be clearly captured, then the method proceeds to step S418, and if the image 930 cannot be clearly captured, then the method proceeds to step S414.

Next, the method proceeds to step S414, whether there is another second camera unit 120 is determined by the tracking unit 150. If there is another second camera unit 120, then the method proceeds to step S416, and if there is no other second camera unit 120, then the method returns to step S404.

Then, the method proceeds to step S416, a next second camera unit 120 is selected by the tracking unit 150, the method returns to step S410 until the image 930 is clearly captured by one particular second camera unit 120.

Afterwards, the method proceeds to step S418, whether the image 930 matches the second searching term is determined by the processing unit 140. If the image 930 matches the second searching term, then the method proceeds to step S420, and if image 930 does not match the second searching term, then the method returns to step S404.

After that, the method proceeds to step S420, the image 930 is clearly captured by the second camera unit 120.

Lastly, the method proceeds to step S422, the image 930 is enlarged in the sub-window 940 of the image 910 by the processing unit 140.

Figure 5:
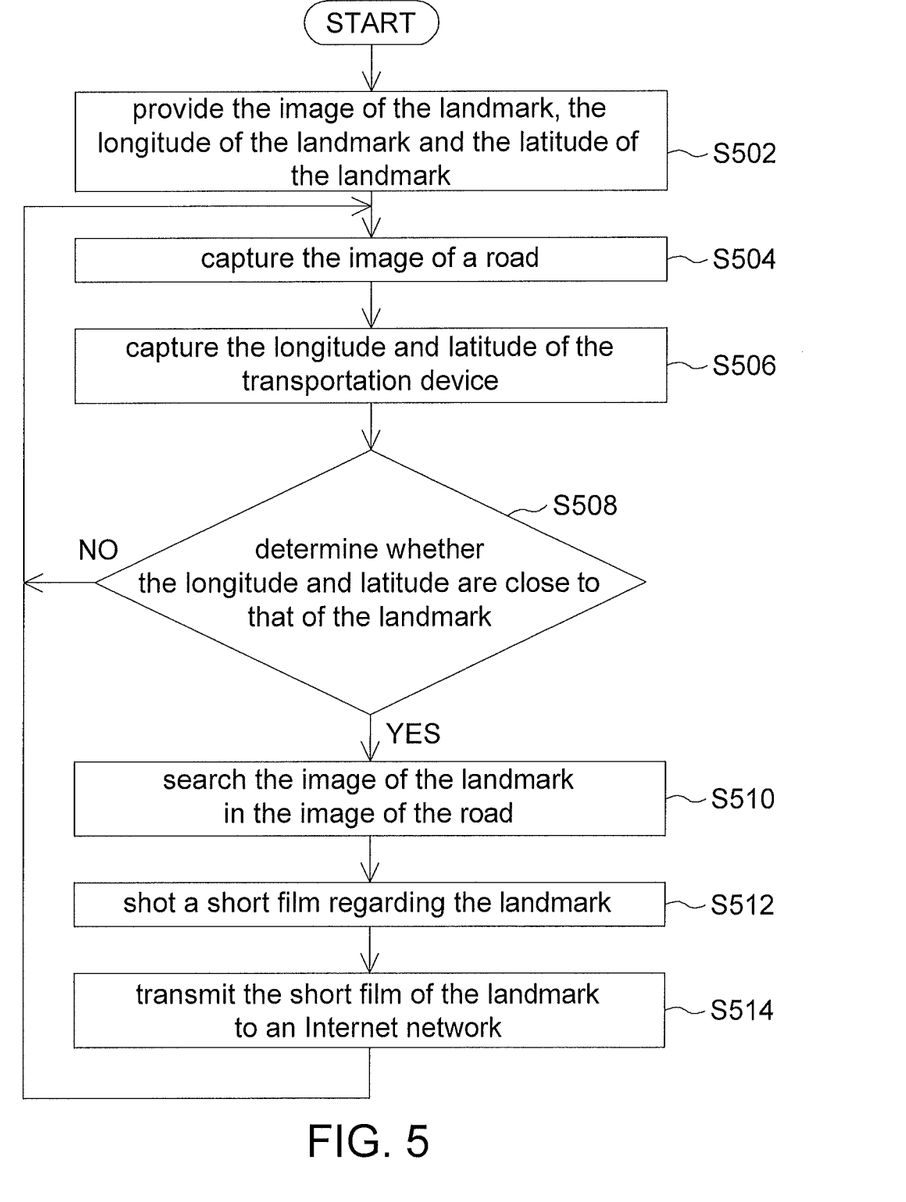
FIG. 5 shows a flowchart of automatically searching the image of a landmark according to the present embodiment of the disclosure.

FIG. 5 shows a flowchart of automatically searching the image 950 of a landmark according to the present embodiment of the disclosure. During the movement of the transportation device, the navigation information will be more vivid to the user if the image 950 (shown in FIG. 2) can be automatically searched and used as an assisted reference material of navigation information. The following procedures illustrate how the image processing system 100 automatically searches the image 950 and makes the navigation information more vivid to the user.

Firstly, the method begins at step S502, the image 950 of the landmark, the longitude of the landmark and the latitude of the landmark are provided by the storage unit 160.

Next, the method proceeds to step S504, the image 910 is captured by the first camera unit 110.

Then, the method proceeds to step S506, the longitude and latitude of the transportation device (not illustrated) is captured by the GPS receiving unit 170.

Afterwards, the method proceeds to step S508, whether the longitude and latitude are close to that of the landmark is determined by the processing unit 140. If the longitude and latitude are close to that of the landmark, then the method proceeds to step S510, and if the longitude and latitude are not close to that of the landmark, then the method returns to step S504.

After that, the method proceeds to step S510, the image 950 is searched in the image 910 by the processing unit 140. In the present step, the processing unit 140 searches the image 950 according to a number of third searching terms which are for searching the image 950.

Following that, the method proceeds to step S512, a short film regarding the landmark is shot by the second camera unit 120, wherein the short film has a predetermined length such as 10 seconds.

Lastly, the method proceeds to step S514, the short film of the landmark is transmitted to an Internet network 800 by the communication unit 180.

Figure 6:
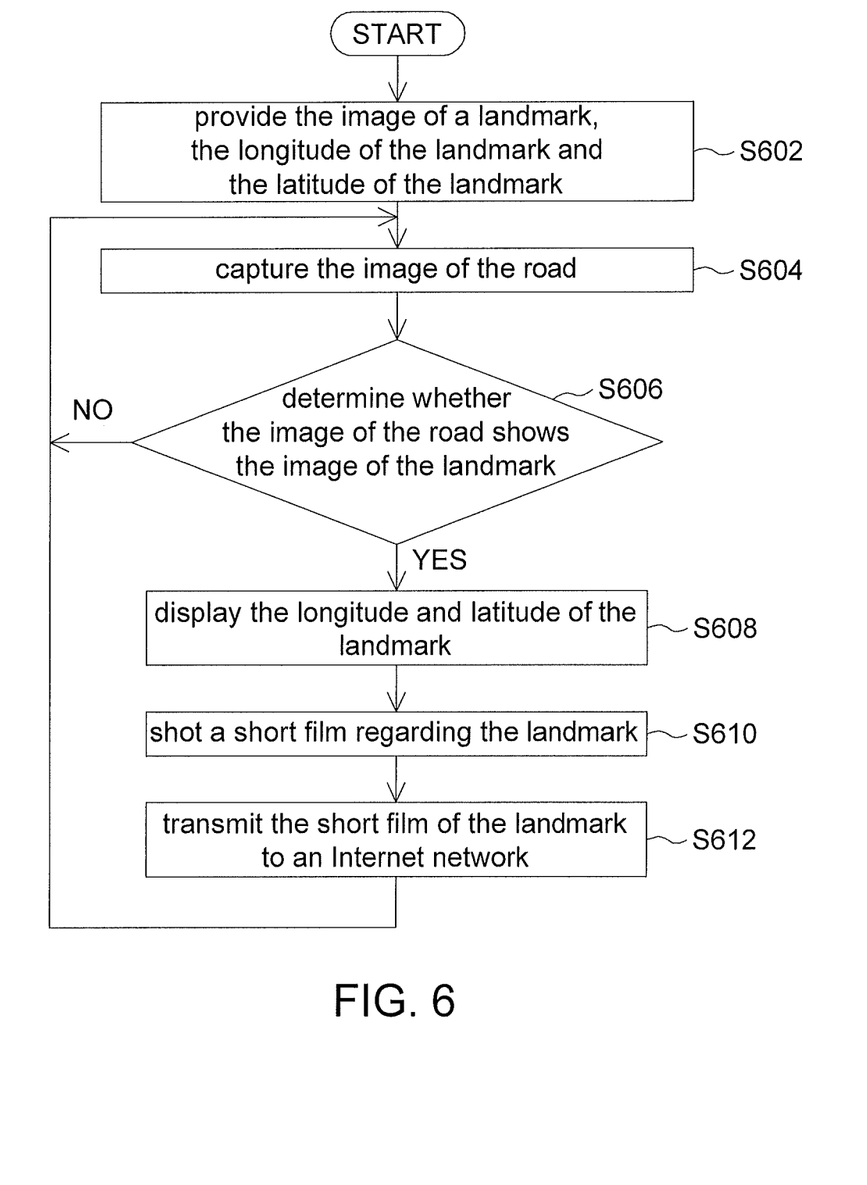
FIG. 6 shows another flowchart of automatically searching the image of the landmark according to the present embodiment of the disclosure.

FIG. 6 shows another flowchart of automatically searching the image 950 according to the present embodiment of the disclosure. During the movement of the transportation device, if the longitude and latitude are unknown, then the image 950 is automatically searched and used as an assisted reference material of the longitude and latitude of the transportation device. The following procedures illustrate how the image processing system 100 automatically searches and uses the image 950 as an assisted reference material of the longitude and latitude of the transportation device.

Firstly, the method begins at step S602, the image 950 of the landmark, the longitude of the landmark and the latitude of the landmark are provided by the storage unit 160.

Next, the method proceeds to step S604, the image 910 is captured by the first camera unit 110.

Then, the method proceeds to step S606, whether the image 910 shows the image 950 is determined by the processing unit 140. If the image 910 shows the image 950, then the method proceeds to step S608, and if the image 910 does not show the image 950, then the method returns to step S604. In the current step, the processing unit 140 searches the image 950 according to a number of third searching terms which are for searching the image 950.

Afterwards, the method proceeds to step S608, the longitude and latitude of the landmark are displayed by the display unit 130. In another embodiment, the present step can display the longitude and latitude of the landmark by an ordinary display panel without a touch control function.

After that, the method proceeds to step S610, a short film regarding the landmark is shot by the second camera unit 120, wherein the short film has a predetermined length such as 10 seconds.

Lastly, the method proceeds to step S612, the short film of the landmark is transmitted to the Internet network 800 by the communication unit 180.

Figure 7:
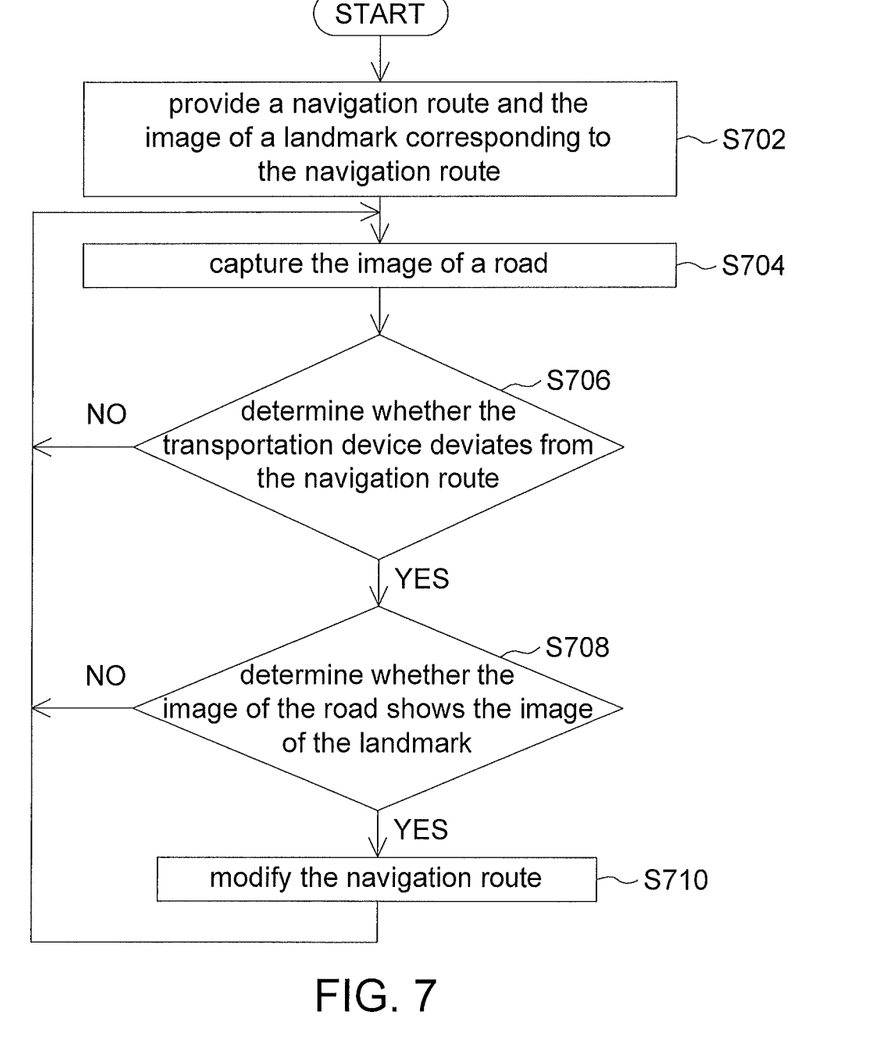
FIG. 7 shows a flowchart of confirming a navigation route according to the present embodiment of the disclosure.

FIG. 7 shows a flowchart of confirming a navigation route according to the present embodiment of the disclosure. During the movement of the transportation device, the transportation device may incidentally deviate from the navigation route for many reasons when the driver takes a wrong turn at an intersection, passes through the crossing of a viaduct and a road, or comes across a detour due to road work. Under these circumstances, the transportation device is still headed towards the destination and there is no need to modify the navigation route. The following procedures illustrate how the image processing system 100 automatically checks whether the driver is still headed toward the destination when the transportation device deviates from the navigation route.

Firstly, the method begins at step S702, the navigation route and the image 950 of the landmark, corresponding to the navigation route are provided by the storage unit 160.

Next, the method proceeds to step S704, the image 910 is captured by the first camera unit 110.

Then, the method proceeds to step S706, whether the transportation device deviates from the navigation route is determined by the processing unit 140. If the transportation device deviates from the navigation route, then the method proceeds to step S708, and if the transportation device does not deviate from the navigation route, then the method returns to step S704.

Afterwards, the method proceeds to step S708, whether the image 910 shows the image 950 is determined by the processing unit 140. If the image 910 shows the image 950, then the method proceeds to step S710, and if the image 910 does not show the image 950, then the method returns to step S704. The processing unit 140 searches the image 950 according to a number of landmark searching terms.

Lastly, the method proceeds to step S710, the navigation route is modified by the processing unit 140.

The image processing system and method of the present embodiment of the disclosure perform various types of analysis on the actual image of the road, and can be used in a navigation system to increase its practicality.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method, comprising:
providing a navigation route of a transportation device and the image of a landmark corresponding to the navigation route;
capturing the image of a road by a first camera unit;
determining whether the image of the road shows the image of the landmark when the transportation device deviates from the navigation route; and
modifying the navigation route if the image of the road does not show the image of the landmark.

2. The image processing method according to claim 1, wherein in the step of determining whether the image of the road shows the image of the landmark, the image of the landmark is searched by a plurality of searching terms of the image of the landmark.

3. An image processing system configured in a transportation device, wherein the image processing system comprises:
a storage unit configured to store a navigation route and an image of a landmark corresponding to the navigation route;
a first camera unit configured to capture the image of a road; and
a processing unit configured to determine whether the image of the road shows the image of the landmark when the transportation device deviates from the navigation route, and to modify the navigation route if the image of the road does not show the image of the landmark.

4. The image processing system according to claim 3, wherein the processing unit is configured to search the image of the landmark according to a plurality of searching terms of the image of the landmark.

* * * * *